United States Patent [19]

Arisi

[11] Patent Number: 4,527,908
[45] Date of Patent: Jul. 9, 1985

[54] INSTRUMENT UNIT FOR MEASURING TEMPERATURES AND HEAT FLUX IN EVAPORATIVE WALLS OF STEAM GENERATORS

[75] Inventor: Sergio Arisi, Milan, Italy

[73] Assignee: Cise - Centro Informazioni Studi Esperienze S.p.A., Milan, Italy

[21] Appl. No.: 574,249

[22] Filed: Jan. 26, 1984

[30] Foreign Application Priority Data

Jul. 7, 1983 [IT] Italy ............................. 21965 A/83

[51] Int. Cl.³ .............................................. G01K 1/08
[52] U.S. Cl. .................................... 374/147; 374/148; 374/29; 165/11 R; 122/448 R
[58] Field of Search ............... 374/136, 148, 135, 137, 374/147, 29, 30, 112; 165/11 R; 138/111, 115; 122/512, 448

[56] References Cited

U.S. PATENT DOCUMENTS 4,023,411  5/1977  Escher .............................. 165/11 R
4,220,199  9/1980  Romanos .................... 122/DIG. 13

Primary Examiner—Charles Frankfort
Assistant Examiner—David R. Schuster
Attorney, Agent, or Firm—Cushman, Darby & Cushman

[57] ABSTRACT

This invention relates to an instrumented unit for measuring temperatures and heat flux in evaporative walls of steam generators composed of a series of parallel tubes comprising a temperature measurement device formed from a plurality of sensors extending fluid-tight from a support member and inserted non-forcibly into complementary curved seats of constant radius provided in the cross-section of one of the tubes, the support member being fixed in straddling relationship and comprising, for the sensors, seats which are fluid-tight against the tube.

1 Claim, 3 Drawing Figures

INSTRUMENT UNIT FOR MEASURING TEMPERATURES AND HEAT FLUX IN EVAPORATIVE WALLS OF STEAM GENERATORS

This invention relates to an instrumented unit for measuring temperatures and heat flux in evaporative walls of steam generators, which allows easy positioning and replacement of the measurement thermocouples, ensures sealing in the instrumented zone in case of fluid leakage, and in addition is robust and easy to mount, including on plants in operation during maintenance periods.

Experts of the art are familiar with the particular problems deriving from inefficiency or poor operation inside steam generators, in particular on the evaporative walls, in the case of installations such as thermoelectric power plant.

It is well known that heat transfer between the products of combustion and evaporating water is influenced to a considerable degree by the extent of incrustation and deposits which can occur both on the inside and outside of evaporative tubes.

These latter can thus be found to operate at a temperature much higher than the design temperature.

It would therefore be useful to be able to measure abnormal operating conditions by means of temperature sensors, in order to prevent faults arising or provide warning thereof. The problem is particularly felt when the fuel used is coal. In this case, the large quantities of ash produced by the combustion can lead to both heavy incrustation and intense erosion on the heat transfer surfaces.

With reference to the cross-section through an evaporative tube, it is convenient to measure a first temperature in proximity to the surface most exposed to the products of combustion, a second temperature in the same radial position as the preceding but in proximity to the surface lapped by the feed water, and a third temperature in a position diametrically opposite the preceding, where the heat flux is practically absent, and which represents the feed water temperature with good approximation.

In this respect, knowing the first two temperatures and the distance between the relative measurement points, the heat flux can be calculated.

Formation of incrustation on the inner wall of the tube is indicated by the variation in the difference between the second and third temperature, whereas abnormal increases in the first temperature indicate erosion of the walls exposed to the products of combustion. Precisely because of these considerations, evaporative tubes have been constructed in which the measurement thermocouples are positioned in surface slots provided transversely on the tube, and are protected by angle sections or suitable sheaths. The ends of said thermocouples are inserted into bores provided in the aforesaid measurement zones.

A further construction comprises sliding and positioning seats for the thermocouples, formed by providing a series of bores essentially along a set of chords one following the other in a section of the tube.

By welding the ends of said bores, a seat becomes created for the thermocouple inside the tube thickness, and formed by the combination of a number of rectilinear portions equal to the number of bores formed.

This construction presents particular problems in forming the various welds, and in positioning the thermocouples, which are difficult if not impossible to replace. In addition, there are substantial sealing problems because the entire aforesaid set of bores and welds must be such as to ensure that there is no leakage of fluid from the tube, and must therefore be executed in an absolutely perfect and accurate manner.

The object of the present invention is to obviate said drawbacks by allowing thermocouple replacement in the case of faults, a good fluid seal in the case of tube erosion in the instrumented zone, and at the same time an increase in the strength and life of the measurement unit.

This object is attained according to the present invention by an instrumented unit for measuring temperatures and heat flux in evaporative walls of steam generators composed of a series of parallel tubes, characterised by comprising a temperature measurement device composed of a plurality of sensors extending fluid-tight from a support member and inserted non-forcibly into complementary curved seats of constant radius provided in the cross-section of one of said tubes, said support member being fixed in straddling relationship and comprising, for said sensors, seats which are fluid-tight against said tube.

The structural and operational characteristics of an instrumented unit according to the invention will be more apparent from the description given hereinafter with reference to the accompanying diagrammatic drawings in which.

Figure 1:
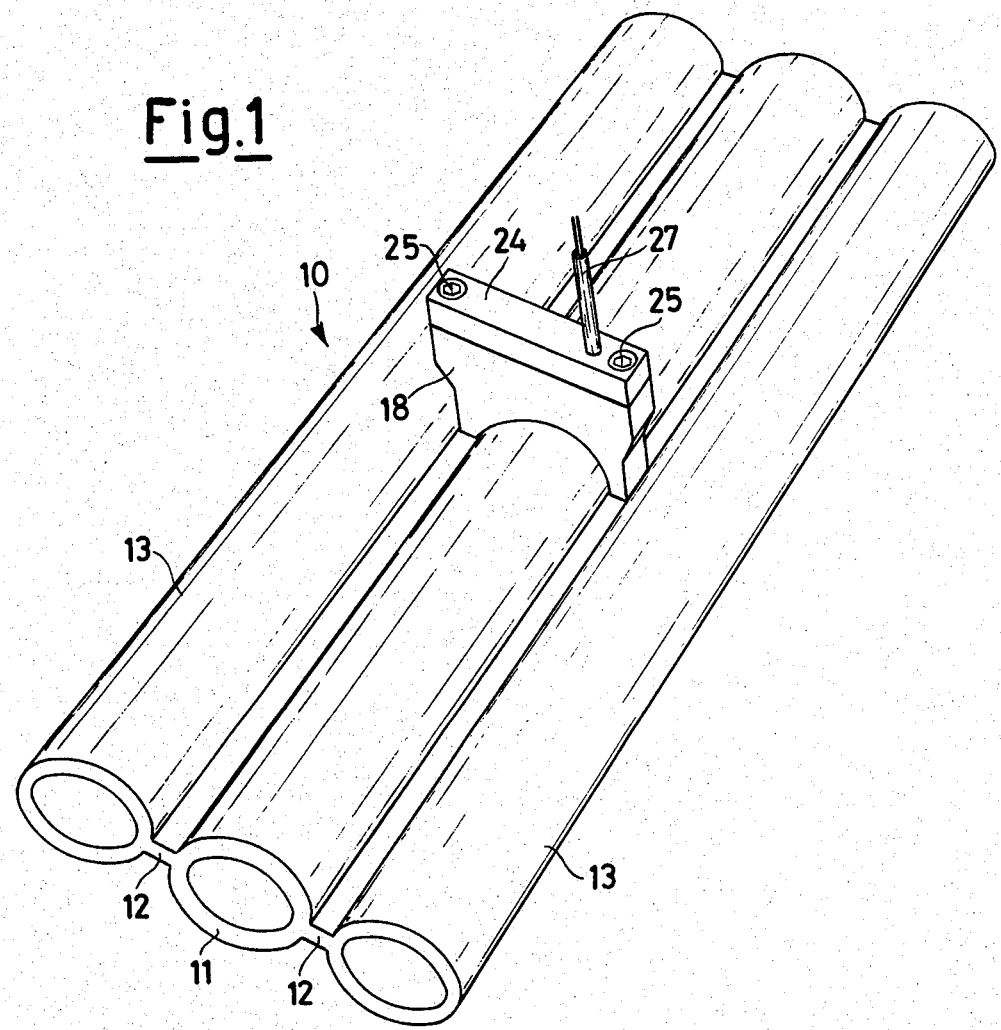
FIG. 1 is a perspective view of an instrumented unit according to the invention mounted on an evaporative wall sector.
Figure 2:
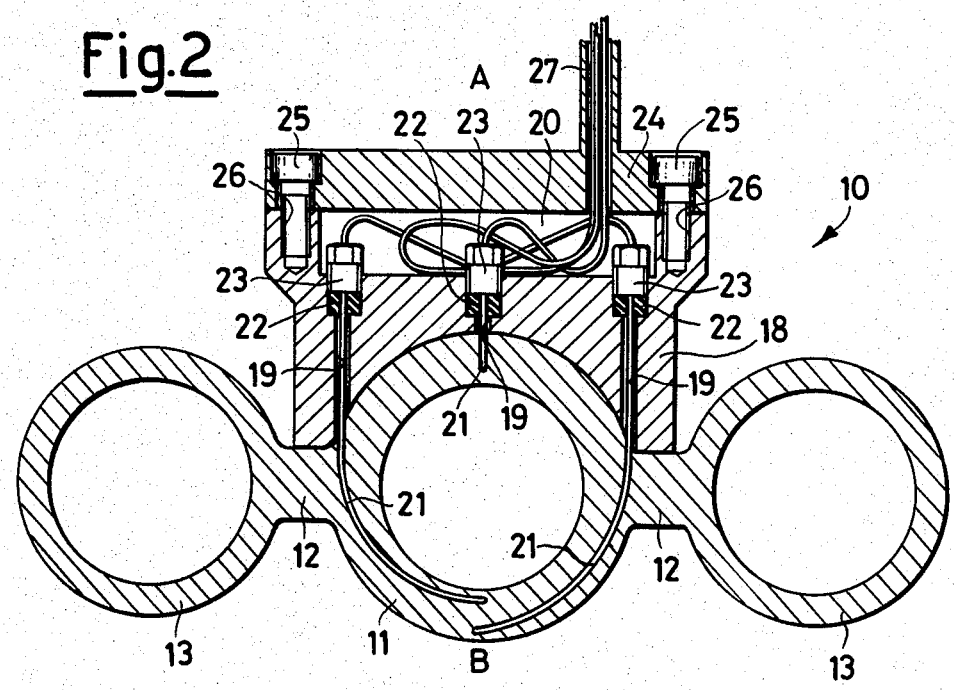
FIG. 2 is a partial cross-section through said instrumented unit mounted on the evaporative wall sector.
Figure 3:
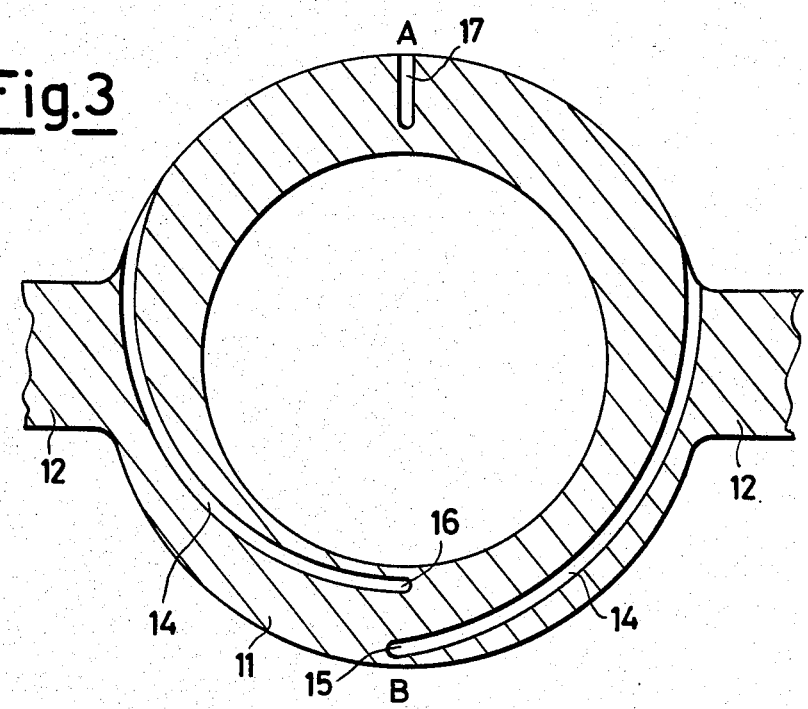
FIG. 3 is a cross-section through the single tube into which the thermocouples are inserted.

With reference to the drawings, an evaporative wall panel or sector 10 of a steam generator (not shown) comprises for example a central tube 11 joined by diaphragms 12 to two side tubes 13 of smaller wall thickness than the central tube 11, but of the same inner diameter.

In one transverse section, there are formed by electroerosion in the walls of said central tube 11 a pair of arcuate cavities 14, which extend from a zone above the diaphragms 12 on the side A at the outer wall of the generator, to the points 15 and 16 disposed on the same radius. The first point 15 is in proximity to the surface exposed to the products of combustion (side B) while the other point 16 is in proximity to the inner surface of the tube 11 lapped by the feed water.

In a position diametrically opposite the two preceding measurement points 15 and 16 there is provided a radially directed bore 17 which terminates in proximity to the inner wall of the tube.

A saddle-shaped box member 18 is disposed and welded on the central tube 11 in that zone comprising the two cavities 14 and the bore 17, so that these latter are in positions corresponding with three bores 19 provided in said member 18.

The other end of the bores 19, which is considerably widened and threaded, emerges into a seat 20. Three thermocouples 21 are inserted into the cavities 14 and bore 17, passing through the bores 19, and carry seal gaskets 22, for example of lamellar graphite, which act on the protection sheaths and are kept in their seat by pressure bushes 23 screws therein. A cover 24, provided with locking screws 25 inserted into theaded bores 26 of the member 18, upperly closes the seat 20.

A protection tube 27 is fixed on to the cover 24 in a position corresponding with a relative bore, and enables the thermocouples 21 to be connected to the reading instrument (not shown). An instrumented unit constructed in this manner enables wall temperatures to be monitored and thermal flux to be determined during operation.

The arcuate cavities 14 are obtained by electroerosion using a suitable device which moves the electrode along circumferential arcs, such as to obtain a seat for the thermocouple 21 which is particularly precise. The form of said cavities 14 also allows simple replacement of the thermocouples 21 if faults arise. The special seal gaskets 22 acting on the thermocouples 21 protect the instrumented zone should fluid leak due to erosion of the wall of the evaporative tube 11.

A panel 10 carrying the instrumented unit according to the invention can be easily positioned on the plant, and this can be done with considerble rapidity because the tube welds can be made without special precautions, as they are in zones fairly distant from the instrumented section.

I claim:

1. An instrumented unit for measuring the temperatures and heat flux in evaporative walls of steam generators composed of a series of parallel tubes, characterised by comprising a temperature measurement device composed of a plurality of sensors extending in a fluid-tight manner from a support member and inserted non-forcibly into complementary curved seats of constant radius provided in a cross-sectional wall portion of one of said tubes, said support member being fixed in straddling relationship to said one tube and comprising, for said sensors, seats which are fluid-tight against said one tube.

* * * * *